United States Patent [19]

Young

[11] 3,959,428
[45] May 25, 1976

[54] COOLING SLIDE
[75] Inventor: John H. Young, Lancaster, Pa.
[73] Assignee: Armstrong Cork Company, Lancaster, Pa.
[22] Filed: Apr. 12, 1972
[21] Appl. No.: 243,271

[52] U.S. Cl............................. 264/145; 264/160; 264/175; 264/237
[51] Int. Cl.² ........................................ B29D 7/14
[58] Field of Search ........... 264/153, 160, 175, 180, 264/245, 324 R, 177, 176, 145, 237

[56] References Cited
UNITED STATES PATENTS

| | | |
|---|---|---|
| 2,338,770 | 1/1944 | Leguillon.................... 264/342 R X |
| 2,722,265 | 11/1955 | Kelly et al...................... 264/245 X |

Primary Examiner—Robert F. White
Assistant Examiner—Thomas P. Pavelko

[57] ABSTRACT

A vinyl sheet material is formed on consolidation rolls. As the vinyl sheet material leaves the rolls, it is placed upon an inclined water slide. At the end of the water slide there is positioned a pair of pinch rolls which retard the movement of the vinyl sheet down the water slide. The vinyl sheet is actually pushed down the water slide and thereby develops compressive stresses therein. The vinyl sheet is later cut into individual tile units.

3 Claims, 1 Drawing Figure

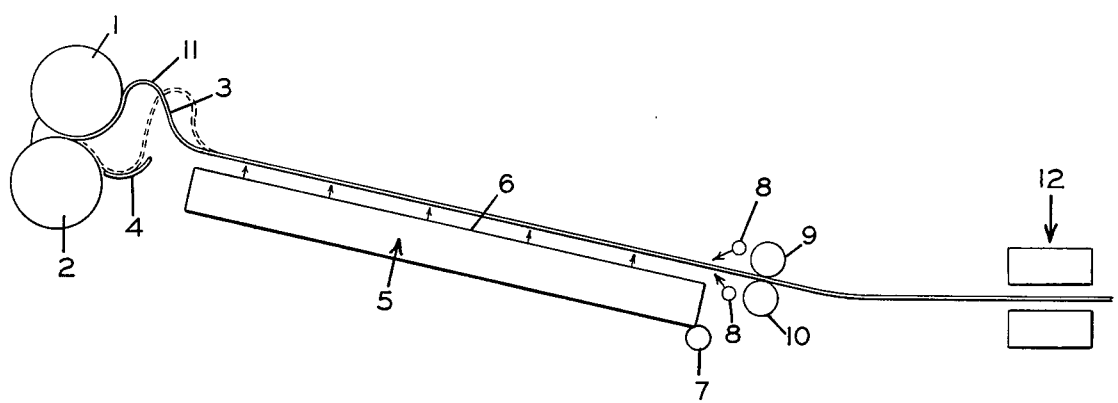

COOLING SLIDE

BACKGROUND OF THE INVENTION

1. Field of the Invention

The invention is directed to an apparatus and method for making a sheet material and, more particularly, to a sheet of material which is made into floor tile.

2. Description of the Prior Art

It is old in the flooring art to make floor tile by forming a sheet material on a mill which is a pair of consolidation rolls. The vinyl sheet material is stripped off the rolls and cooled by passing the sheet material through a water bath. The sheet material then, after cooling, is passed down to a conventional punch press structure which stamps individual 12 × 12 inch tiles from the sheet material. Tile normally formed in this manner is formed with tension stresses therein. That is, during the cooling of the vinyl sheet, it was subject to tension along the direction of sheet travel. When the vinyl sheet is cooled, the stresses in the sheet due to the tension on the sheet are set in the sheet. When the sheet is cut into small individual tile units, the mass of the sheet is not sufficient to prevent the sheet from shrinking in the along-machine-direction as the stresses relax. The only way the tension stresses are relaxed in the sheet is for the sheet to shrink in its along-machine-direction of processing. This results in a tile which is unstable and when these tiles are placed on a flooring, the changing of the size of the tiles causes the development of gaps between individual tiles.

U.S. Pat. No. 2,973,770 discloses that it is old to use a water slide for sliding a piece of material down into a water bath. Therein the gravity action on the piece of material is permitted to carry it down the water slide and then into the water bath. The material is then pulled out of the water bath in a cool state. Herein there is no particular consideration to stresses and the fact that the material is moving by gravity down an inclined surface means that the material is being pulled off the forming structure due to the mass of the material which is already on the water slide. This creates tension stresses within the material, which stresses are locked into the material as it is cooled.

SUMMARY OF THE INVENTION

Tile units are cut from a sheet. The sheet is initially formed on consolidating rolls which take a mass of vinyl material, in a sticky granular form, and convert the vinyl material to a sheet. The sheet is fed off of one of the rolls onto an inclined slide which has water flowing therealong. At the end of the slide, a set of pinch rolls retards the movement of the vinyl sheet down the water slide. The pinch rolls are rotating at a speed less than that of the consolidating rolls. This results in the setting of a subtle compression within the sheet during the cooling process. The sheet can be laid as sheet flooring or installed as a wall covering or the sheet may be passed to a punch press structure to have individual tile units formed. The above-described technique has been found to be particularly useful in the forming of tile from an all-vinyl material. However, it can be used also with vinyl material which has been filled with asbestos, which provides a hot strength to the vinyl sheet.

BRIEF DESCRIPTION OF THE DRAWING

The drawing is a schematic view of the invention herein.

DESCRIPTION OF THE PREFERRED EMBODIMENT

The tile may be formed from the material such as that set forth in U.S Pat. No. 2,773,851. The product is made basically in the same manner as that set forth for making the products of the above-mentioned patent. The invention herein is in the means used to cool the blanket of the above-mentioned patent. The invention herein could be equally well used with that of commonly assigned copending application Ser. No. 866,711, filed Oct. 15, 1969, in the name of George W. Loosemore and entitled "Organic Fiber-Filled Tile". The process can be used particularly to make a vinyl-limestone product which has no fiber fillers. Also the process is not limited to vinyl compositions, but may be used with thermoplastic binder systems in general, and particularly to systems using asphalt, coumarone-indene, polystyrene, polyurethane, etc.

Referring to the drawing, it will be seen that the mill or roll structure which forms the vinyl sheet material is composed of two rolls, the upper roll 1 and the lower roll 2. The product could be made on a first mill which is then followed by a calender roll structure to provide the sheet material with a smooth surface. The product can equally well be made in the manner shown in which the mill and calender are combined as a single structure, the consolidating rolls. If a smooth surface product is to be formed, the upper roll 1 will be of polished steel. When a smooth surface product is formed, the formed sheet material 3 tends to stick to the upper roll for a short time after it passes through the nip of the rolls. A conventional doctor blade removes the sheet material from the upper roll when it is formed with a smooth surface. When the upper roll 1 is provided with an embossed pattern, the lower roll 2 then usually has a hard rubber surface, and the sheet material or blanket 3 then has an affinity to stick to the lower roll surface. A doctor blade then is used to strip the blanket off the lower roll 2, and a guide structure 4 is used to direct the blanket up onto the water slide.

The water slide will consist of a series of sections, each section will function as a separate zone in the slide. The composite slide will, in essence, appear to be a flat stainless steel plate with holes drilled through the surface. The purpose of the holes is to allow water or air to "well-up" through the surface of the plate. The water will supply a fluid media to convey and cool the tile blanket as it moves down the slide 5. The surface 6 of the conveyor will have the fluid medium layer which is used to cool and convey the tile blanket. The size and number of holes required will be a function of the water capacity, the jet velocity needed for uniform cooling, the convection cooling dwell time for water, and the head requirements needed to support the weight of the tile blanket. Between each zone there will be a return water trough to remove the warmed water. The conveyor will be pivotally mounted at point 7 so that the elevation of the infeed end of the conveyor can be changed to pick the blanket off either the top or bottom roll. Any change in the elevation can be accomplished by any normal type of lifting structures, for example, air cylinders.

So-called air doctors 8 may be utilized both above and below the blanket to blow excess water off the blanket as it comes off the conveyor 5. At the time the blanket leaves the conveyor, it will have been cooled to such a point that it is now sufficiently rigid to be handled. At the end of the conveyor is a pinch roll feeder structure composed of an upper roll 9 and a lower roll 10. The speed of the pinch roll feeder will be mechanically related to the speed of rolls 1 and 2. The bottom roll 10 may be knurled steel while the top roll 9 will probably be a rubber-coated roll. The rolls will be approximately 6 inches in diameter. The nip pressure will be regulated by two air cylinders which will operate to maintain a nip pressure of approximately 2 pounds per linear inch of material passing through the nip of the two rolls. The retarding effect of the pinch rolls can be accomplished by the use of a slow-moving conveyor which is positioned at the end of the water slide. The mass of the sheet material on the slow conveyor will still maintain the compression in the blanket 3.

In principle, the tile blanket will be pushed onto the water slide. To accomplish this, a hump 11 in the tile blanket 3 will be maintained on the infeed end of the water slide. This hump 11 must be maintained at all times, and it can be maintained by an operator visually watching it or a simple photoelectric cell control system could be provided for detecting and regulating the hump. The amount of the hump 11 in the blanket will be regulated by the ratio of the speed of the consolidating rolls (1 and 2) versus the speed of the pinch rolls (9 and 10). Due to thermal shrinkage, the blanket velocity out of the water slide will be about 0.994 of the velocity in. The velocity into the water slide will be the top roll surface speed for smooth surface patterns, and the bottom roll surface speed for embossed patterns. It is obvious from the above that the speed of rotation of the rolls 9 and 10 will be somewhat less than the speed of rotation of the rolls 1 and 2. This lesser speed will be due to the fact that there will be shrinkage of the blanket on the water slide, and this lesser speed is needed for the maintaining of the hump 11. With the pinch rolls or any other retarding assembly in effect holding back on the movement of the blanket down the water slide and the pushing of the blanket down the water slide by the rolls 1 and 2, as evidenced by the presence of the hump 11, it will be seen that the slide is constructed in such a way as to keep the blanket in subtle compression during the cooling process. This approach eliminates the stresses which were previously caused in old systems by the thermal contraction and mechanical stretching. In effect, the blanket is being cooled from 350° F. to about 100° F. with compression stresses rather than tension stresses. When the tile blanket is later cut into tiles, by a press structure 12, as is conventional in the art, and the tiles are laid on a floor, there will not be the development of gaps between individual tiles as stresses relax. If the tile has been laid on a floor for a period of time, the stresses in the tile will gradually relax. If there are tension stresses in the tile, the relaxing of these stresses will cause a reduction in the length of the tile in the machine direction in which the tile was made. This results in the development of a gap between pieces of tile. If the tile is made with a compression stress therein, as the stresses relax, there would be a tendency for the tile to grow in size. However, since the tile is now laid within a floor pattern, it is not possible for the tile to grow because there are adjacent tiles holding it in place. A side advantage of the use of the water slide is that shrinkage across the machine direction is also readily permitted.

What is claimed is:

1. A method of forming a product consisting the steps of consolidating thermoplastic material into a sheet form, feeding the thermoplastic material to an inclined fluid-covered slide to cool the material, at the point where the thermoplastic sheet leaves the water slide, retarding the movement of the sheet so that a free-standing hump is formed in the sheet in the region prior to the time the sheet enters the water slide whereby the sheet is being pushed down the water slide and subjected to compressive stresses.

2. The method of claim 1 wherein the cooled sheet is cut into individual tile units.

3. The method of claim 1 wherein the retarding of the movement of the sheet results in the sheet moving from the slide at a speed less than the speed the blanket is fed onto the slide and that the speed difference is greater than that which would occur from just simple sheet size shrinkage such that the sheet is formed with a free-standing hump therein at the beginning of the slide.

* * * * *